(12) United States Patent
Cartwright

(10) Patent No.: US 10,631,541 B1
(45) Date of Patent: Apr. 28, 2020

(54) NITROGEN-15 ISOTOPE AS A PLANT GROWTH REGULATOR

(71) Applicant: Floratine Products Group, Inc, Collierville, TN (US)

(72) Inventor: Timothy B. Cartwright, Collierville, TN (US)

( * ) Notice: Subject to any disclaimer, the term of this patent is extended or adjusted under 35 U.S.C. 154(b) by 0 days.

(21) Appl. No.: 15/815,496

(22) Filed: Nov. 16, 2017

Related U.S. Application Data

(60) Provisional application No. 62/422,691, filed on Nov. 16, 2016.

(51) Int. Cl.
*A01N 59/00* (2006.01)
*C05C 11/00* (2006.01)

(52) U.S. Cl.
CPC .............. *A01N 59/00* (2013.01); *C05C 11/00* (2013.01)

(58) Field of Classification Search
None
See application file for complete search history.

(56) References Cited

U.S. PATENT DOCUMENTS 6,086,923 A * 7/2000 Stoller .................. A01N 47/28
424/630

OTHER PUBLICATIONS

D. T. Westermann et al., "Nitrogen Fertilizer Efficiencies on Potatoes," American Potato Journal, vol. 65, published 1988, pp. 377-386.*

* cited by examiner

*Primary Examiner* — Monica A Shin
(74) *Attorney, Agent, or Firm* — Veritay Group, IP PLLC; Susan B. Fentress

(57) ABSTRACT

This invention provides a method of enhancing plant growth involving the steps of: providing an application of nitrogen-15 isotope to a plant to obtain a concentration of nitrogen-15 isotope at least 10 percent greater than the concentration occurring in an untreated plant. A plant growing in a treated area exhibits at least one of: increased plant yield measured in terms of increased root length and increased leaf area compared to a plant growing in a portion of untreated soil. Furthermore, the step of providing the application of nitrogen-15 isotope to a plant includes treating a foliar portion of a plant with a synergistic concentration of a nitrogen-15 isotope, wherein a treated plant exhibits at least one of: increased plant yield measured in terms of increased root length and increased leaf area, compared to a plant growing without a treatment of a synergistic concentration of the nitrogen-15 isotope.

10 Claims, 1 Drawing Sheet
(1 of 1 Drawing Sheet(s) Filed in Color)

Before Treatment
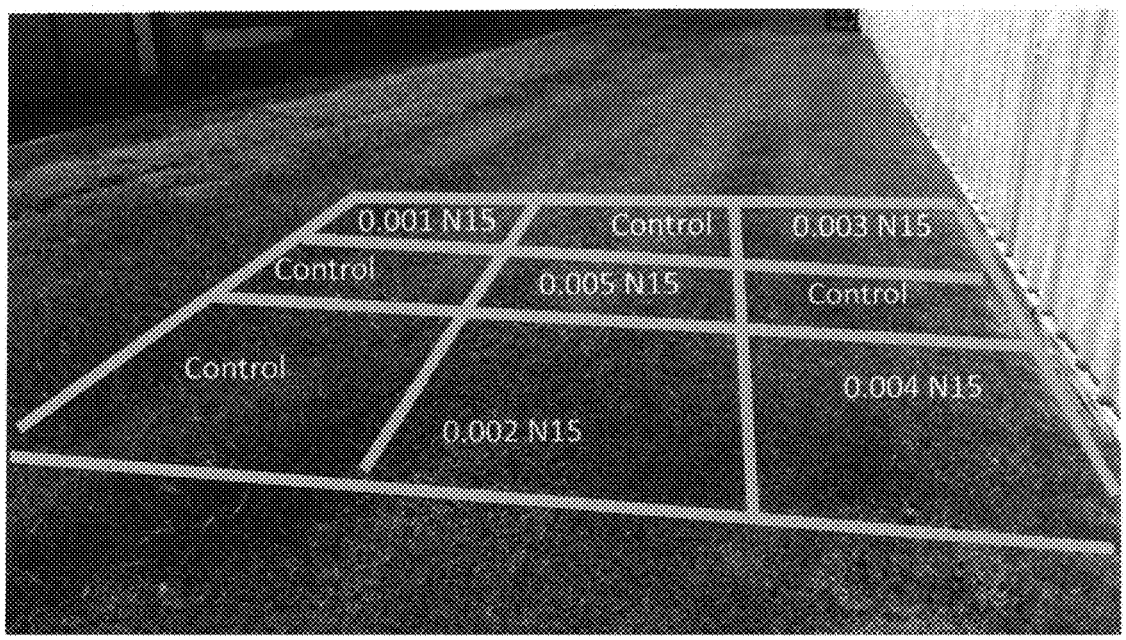
Treated Plots One Week later    Levels of N15
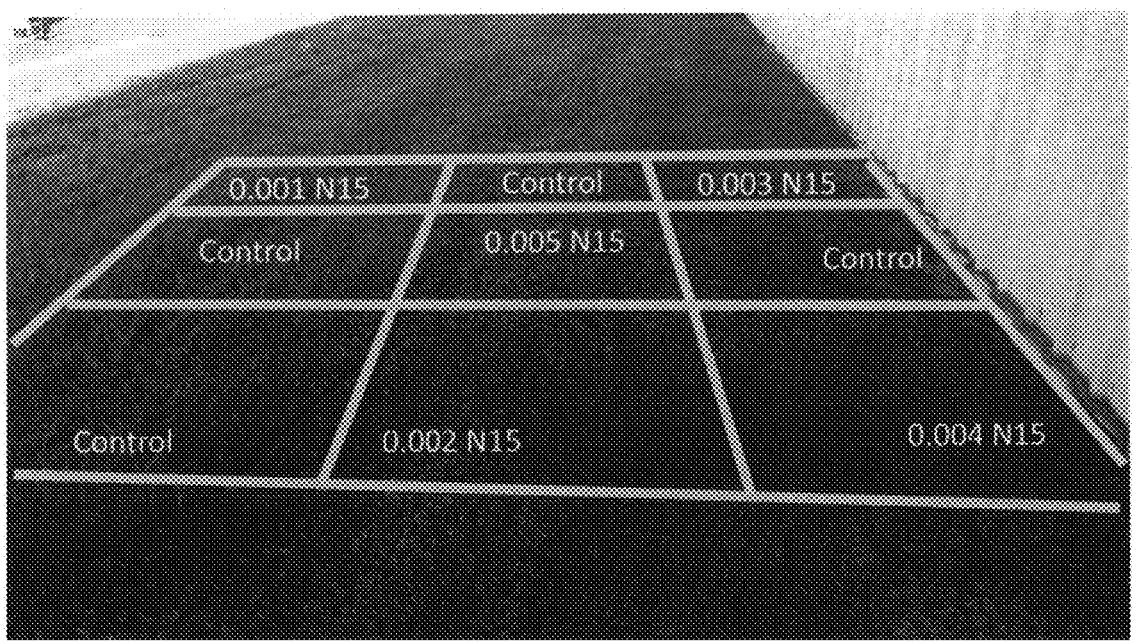

NITROGEN-15 ISOTOPE AS A PLANT GROWTH REGULATOR

CROSS-REFERENCE TO RELATED APPLICATIONS

This application claims the benefit of U.S. Ser. No. 62/422,691 filed on Nov. 16, 2016 under 35 USC § 119(e) (hereby incorporated by reference).

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

STATEMENT REGARDING COLORED DRAWINGS

The patent or application file contains at least one drawing executed in color. Copies of this patent or patent application publication with color drawing(s) will be provided by the Office upon request and payment of the necessary fee.

BACKGROUND OF THE INVENTION

Field of the Invention

The present invention relates to agriculture and horticulture, primarily the use of a nitrogen-15 isotope to facilitate plant growth.

Description of Related Art Including Information Disclosed Under 37 CFR 1.97 and 1.98

There are many treatments used to facilitate plant growth. Organic fertilizers are known to include a small concentration of nitrogen isotopes. Inacio et al. Nitrogen and Carbon Isotope Composition of Organic Fertilizers. Congress Brasilerio Dr Ciencia Do Solo (Jul. 28, 2013). There is a need for developing methods of improving or enhancing plant growth with products that are environmentally friendly, such as modified products obtained from natural sources.

BRIEF SUMMARY OF THE INVENTION

The inventive subject matter relates to a method of enhancing plant growth by providing an application of nitrogen-15 isotope to a plant in a concentration to obtain at least 10 greater percent nitrogen-15 isotope than the concentration naturally occurring in plants. This inventive subject matter includes: a method of enhancing plant growth by providing an application of nitrogen-15 isotope to a plant to obtain a concentration of nitrogen-15 isotope at least 10 percent greater than the concentration occurring in an untreated plant. Furthermore, the inventive subject matter includes the step of providing the application of nitrogen-15 isotope to a plant by treating a foliar portion of a plant with a synergistic concentration of a nitrogen-15 isotope, wherein a treated plant exhibits at least one of: increased plant yield measured in terms of increased root length and increased leaf area, compared to a plant growing without a treatment of a synergistic concentration of the nitrogen-15 isotope. Additionally, the inventive subject matter includes the step of treating a portion of soil adjacent to a plant or to where the plant will be planted with a synergistic concentration of a nitrogen-15 isotope, wherein the plant growing in a treated area exhibits at least one of: increased plant yield measured in terms of increased root length and increased leaf area, compared to a plant growing in a portion of untreated soil. Additionally, the novel subject matter includes: a plant growth regulating composition made of: a nitrogen-15 isotope at a concentration ranging from about 0.001% though 0.004% w/w together with an agriculturally acceptable adjuvant, wherein the composition is capable of inducing a synergistic yield in a plant to which the composition is applied.

BRIEF DESCRIPTION OF DRAWINGS

The patent or application file contains at least one drawing executed in color. Copies of this patent or patent application publication with color drawing(s) will be provided by the Office upon request and payment of the necessary fee. For a fuller understanding of the nature and desired objects of the present invention, reference is made to the following detailed description taken in conjunction with the accompanying drawing figures.

FIG. show a color photograph of plants treated with nitrogen-15 isotope,

DETAILED DESCRIPTION OF THE INVENTION

The present invention may be understood more readily by reference to the following detailed description of the invention. It is to be understood that this invention is not limited to the specific devices, methods, conditions or parameters described herein, and that the terminology used herein is for the purpose of describing particular embodiments by way of example only and is not intended to be limiting of the claimed invention. It is to be understood that this invention is not limited to the specific devices, methods, conditions or parameters described herein, and that the terminology used herein is for the purpose of describing particular embodiments by way of example only and is not intended to be limiting of the claimed invention. Also, as used in the specification containing the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value.

Nitrogen-15, a stable, non-radioactive isotope of nitrogen is provided as a synergistic additive to a fertilizer or a plant growth nutrient formulation. The concentration of nitrogen-15 in the plant growth regulating composition ranges from 0.001% to 0.009% w/w. The optimum concentration is 0.004% w/w. This concentration in the plant growth regulating composition increases the concentration of nitrogen-15 in a plant by 10-20%. The synergistic activity can be increased by adding either cobalt and/or nickel. Additionally, an agriculturally acceptable adjuvant can be added to the plant growth regulator. Nitrogen-15, a stable, non-radioactive isotope of nitrogen can be added to a fertilizer or a micronutrient. The micronutrients include: iron, copper, manganese and zinc.

The plant growth regulating composition according to the invention can be formulated as solid or liquid products. The plant growth regulating composition can include adjuvants such as for example: sugars, amino acids, wetting agents, stabilizers, and acidifiers. The most common spray adjuvant is a non-ionic surfactant or a crop oil concentrate. Crop oil concentrates are a mixture of 80 to 85 percent nonphytotoxic petroleum-based oil plus 15 to 20 percent emulsifier (surfactant).

Some characteristics of the plant growth regulating composition according to the invention are illustrated by the following examples. The laboratory trial involved planting Annual Rye seeds in trays of commercially available potting soil. The seed density on the trays was 358 grams per square meter. The volume of each spray was 12 ml per square meter after the grass emerged. The spray frequency was every other day. The following ingredients were added at these concentrations to a standard sugar solution: Ni 0.003% w/w (Nickel), Co 0.003% w/w (cobalt) and nitrogen-15 0.00001% w/w. The standard sugar solution spray concentration was 1 gram per 300 ml of water as shown in Table 1.

TABLE 1

| Root Length cm | | | |
| --- | --- | --- | --- |
| N-15 | 3.5 | 20.70% | inc |
| Co | 4.1 | 41.40% | inc |
| Ni | 4.1 | 41.40% | inc |
| Ni + CO + NITROGEN-15 | 5.4 | 64.20% | inc |
| Sugar solution | 2.9 | | |
| Blade Length cm | | | |
| N-15 | 7.9 | 25.40% | |
| Co | 7.0 | 11.10% | |
| Ni | 7.3 | 15.90% | |
| Ni + CO + NITROGEN-15 | 9.8 | 55.60% | |
| Sugar solution | 6.3 | | |

Averages of 74 plants per tray after 1 week

A trial on turf was conducted on Common Bermuda. The turf was sprayed once with spray solutions that contained four concentrations of nitrogen-15 ammonium sulfate. The concentrations ranged from: 0.001% though 0.004% w/w. The nitrogen-15 was mixed with a sugar solution as in the laboratory trial. Results: Based on visual color—the plot sprayed with 0.004% was the darkest green as shown in FIG. 1. Percent increase in leaf length was the same as the laboratory trial.

Equivalent elements can be substituted for the ones set forth above such that they perform in substantially the same manner in substantially the same way for achieving substantially the same result. It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages.

The invention claimed is:

1. A method of enhancing plant growth comprising: providing an application of a plant growth regulating composition consisting essentially of a nitrogen-15 isotope at a concentration of between 0.001% to 0.009% w/w and an agriculturally acceptable adjuvant to a plant, wherein the step of providing the application of the plant growth regulator composition comprises treating a portion of soil adjacent to the plant or to where the plant will be planted.

2. The method of claim 1 wherein the nitrogen-15 isotope concentration is at least 20 percent greater than the concentration occurring in an untreated plant.

3. The method of claim 1 wherein the nitrogen-15 isotope concentration is 0.004% w/w of the plant growth regulating composition.

4. The method of claim 1, wherein the plant growth regulating composition further consists essentially of 0.003% w/w of nickel.

5. The method of claim 1, wherein the plant growth regulating composition further consists essentially of 0.003% w/w of cobalt.

6. A method of enhancing plant growth comprising: providing an application of a plant growth regulating composition consisting essentially of a nitrogen-15 isotope at a concentration of between 0.001% to 0.009% w/w and an agriculturally acceptable adjuvant to a plant, wherein the step of providing the application of the plant growth regulator composition comprises treating a foliar portion of the plant.

7. The method of claim 6 wherein the plant growth regulating composition further consists essentially of 0.003% w/w of nickel.

8. The method of claim 6 wherein the plant growth regulating composition further consists essentially of 0.003% w/w of cobalt.

9. The method of claim 6 wherein the nitrogen-15 isotope concentration is at least 20 percent greater than the concentration occurring in an untreated plant.

10. The method of claim 6 wherein the nitrogen-15 isotope concentration is 0.004% w/w of the plant growth regulating composition.

* * * * *